United States Patent [19]

Alie

[11] Patent Number: 4,645,145

[45] Date of Patent: Feb. 24, 1987

[54] COMBINATION TOILET AND VANITY

[75] Inventor: Enrique Alie, Brooklyn, N.Y.

[73] Assignee: Falcon Jet Corporation, Teterboro, N.J.

[21] Appl. No.: 655,516

[22] Filed: Sep. 28, 1984

[51] Int. Cl.⁴ .............................................. B64D 11/06
[52] U.S. Cl. ................................ 244/118.5; 105/314; 4/312; 4/239
[58] Field of Search ...................... 244/118.5; 105/314, 105/315; 4/234, 514, 239, 235, 312, 465; 297/118, 217, 344

[56] References Cited

U.S. PATENT DOCUMENTS

| | | | |
|---|---|---|---|
| 140,324 | 6/1873 | Vetter . | |
| 155,335 | 9/1949 | Delcher, Jr. et al. | D71/1 |
| 155,362 | 9/1949 | Ray | D71/1 |
| 155,363 | 9/1949 | Ray et al. | D71/1 |
| 176,804 | 5/1876 | Patten | 297/14 |
| 2,076,950 | 4/1937 | Koch | 4/312 |
| 2,145,435 | 1/1939 | Smith | 4/312 |
| 2,431,264 | 11/1947 | Lynett | 4/8 |
| 2,590,045 | 3/1952 | Schiff | 105/315 |
| 4,018,166 | 4/1977 | Gutridge et al. | 105/316 |
| 4,177,528 | 12/1979 | James | 4/239 |

Primary Examiner—Galen Barefoot
Attorney, Agent, or Firm—Morgan & Finnegan

[57] ABSTRACT

A combination toilet and vanity for vehicular use comprises a toilet having a bowl and seating portion, the seating portion being horizontally displaceable for moving said seating portion into a forward position closer to a vanity whereby said seating portion may double as a vanity seat. In one embodiment, bellows extend from a seat back portion of the combination seat and tracks with the seat while the seat is displaced in a forward configuration thereby covering the toilet bowl portion.

4 Claims, 3 Drawing Figures

COMBINATION TOILET AND VANITY

BACKGROUND OF THE INVENTION

The invention pertains to lavatories. More particularly, the invention pertains to lavatories for use on board vehicles, such as aircraft, wherein it is desirable to provide both toilet and vanity services.

Providing lavatories on board aircraft is widely known. One could hardly imagine a commercial or corporate class aircraft which would not provide lavatory services for its passengers and crew. For examples of toilets provided on board aircraft, see U.S. Pat. Nos. Des. 155,362 (Ray 1949), 155,335 (Delcher, Jr. et al 1949) and 155,363 (Ray et al 1949). U.S. Pat. No. Des. 155,335 also discloses a sink and mirror provided within a lavatory, such as is also common practice on board vehicles such as aircraft.

With the ever increasing amount of air travel, it is becoming increasingly more important to provide luxuries to air-craft passengers similar to those which they are accustomed to having provided for them while on the earth's surface. One such luxury is the ability to sit in front of a vanity to "freshen themselves up" such as after a long trip or before a business meeting. However, due to space requirements typically found on board aircraft, it has not heretofore been known to provide luxury vanities on board aircraft. Although a tall passenger would probably be able to contort his or her body from a seated position upon a toilet seat or cover such as is provided in the Delcher, Jr. patent (U.S. Pat. No. Des. 155,335) and look into the mirror provided above the sink opposite the toilet, it would be very difficult to remain seated on the toilet seat and still be able to closely inspect the reflection provided in the opposite mirror.

Of course, space permitting, a separate chair may be provided in a standard aircraft lavatory to serve as a vanity seat. However, this would take up an unsatisfactory amount of precious space and would also present storage problems for stowing the vanity seat when not in use. Providing loose chairs may also violate safety rules requiring such components to be secured to the aircraft.

The toilet itself might be installed closer to the bathroom mirror, eliminating the need to contort one's body in order to gaze into the mirror while remaining seated on the toilet seat or cover provided. However, this would make ordinary use of the toilet seat less convenient as it would unacceptably restrict leg room in front of the toilet seat. Such a configuration would further unacceptably restrict the use of the mirror and sink when the occupant is in a standing position in front of the mirror as the close proximity of the toilet seat would interfere with the occupant's maneuvering ability.

It is known to combine a driver's seat and a toilet seat in the operating compartment of locomotives for locomotive engineers. See U.S. Pat. No. 2,431,264 (Lynett 1947). It is also known to provide adjustable vanity seats disposed in front of toilet cabinets such as in Vetter, U.S. Pat. No. 140,324 (1873). It is also known to provide forward sliding seats, such as jump-seats as disclosed in U.S. Pat. No. 176,804 (Patten 1876).

However, there has not heretofore been provided a satisfactory combination toilet and vanity for use on board vehicles, such as aircraft. Space and safety requirements have heretofore seemed prohibitive against providing a satisfactory vanity seat within the aircraft's lavatory.

It is therefore an object of the invention to provide a lavatory for use on board an aircraft which adequately and conveniently provides both toilet and vanity services for the aircraft passengers and crew.

It is a further object of the invention to provide a vehicular toilet seat which doubles as a vanity seat.

It is a further object of the invention to provide a combination toilet and vanity seat for use on board any vehicle.

SUMMARY OF THE INVENTION

These and other objects of the invention are met by providing a lavatory comprising a toilet and a vanity wherein the toilet includes a seat portion which in a first configuration is vertically aligned with the toilet bowl and in a second configuration is displaced in a horizontal plane forward the toilet bowl and thereby serves as a seat for use in front of the vanity. The seat portion is adjustable, such as slidably disposable, within a horizonital plane between the toilet seat configuration and the vanity seat configuration. In one embodiment, the seat is coupled to a seat back which itself is coupled to a bellows whereby when the seat is disposed in its forward vanity configuration, the bellows extend forward following the seat and fill the space otherwise left vacant over the toilet bowl or waste chute.

BRIEF DESCRIPTION OF THE DRAWINGS

The invention will be described more fully below by way of reference to the following drawings, in which.

DETAILED DESCRIPTION OF THE DRAWINGS

Figure 1:
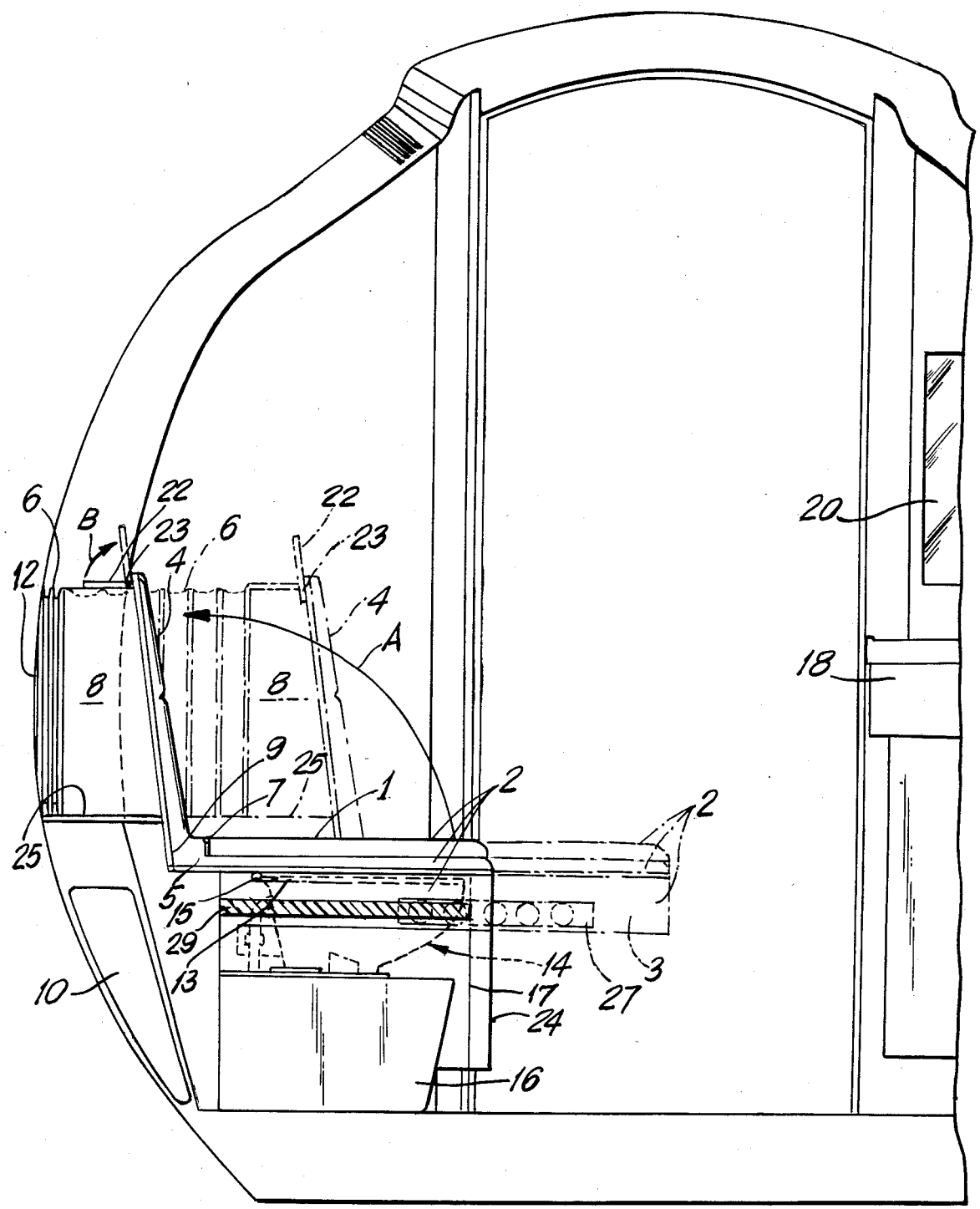
FIG. 1 is a side view elevation showing a lavatory containing a toilet seat and a vanity according to the instant invention.

FIG. 1 is a side view drawing of a lavatory according to the instant invention. Particularly, FIG. 1 illustrates a combination toilet and vanity seat portion 2 shown in its toilet configuration and, in phantom, in its vanity configuration.

FIG. 1 also illustrates a fixed conventional toilet bowl chute and chemical plumbing apparatus 14 and waste tank 16 of a type commonly provided aboard aircraft. Such components, fixed respective e.g., the floor and fuselage of the aircraft, are widely known in the transportation industry. FIG. 1 further illustrates a vanity area including sink 18 and mirror 20 opposite the fixed toilet apparatus 14.

Except as noted otherwise, the term "forward" shall herein refer to the frontwards facing direction of the fixed toilet apparatus 14 without regards to the forward and aft direction of the vehicle within which the lavatory is provided.

Also illustrated in FIG. 1 is a combination toilet seat and vanity seat 2 comprising a seat cover 1, a seat edge 5 and decorative seat side wall 3. The combination toilet and vanity seat 2 is also shown securely coupled to seat back 4 at joint 9.

FIG. 1 also illustrates toilet ring 13 which is shown pivotally secured via hinge 15 to fixed toilet apparatus 14. Alternatively, toilet ring 13 may be secured to combination seat 2 for adjustable movement therewith.

Seat cover 1 is hingably connected to seat edge portion 5 at hinge 7 and may be swung radially upward in the direction of arrow A, thereby exposing the chute portion of fixed toilet apparatus 14 and toilet ring 13 when the combination seat 2 is in its toilet configuration.

Seat back 4, which may be upholstered, is shown rigidly secured to bellows 6 which is further secured at its back, e.g., about wall portion 12. When the combination seat 2 is in its extended vanity configuration (shown in phantom in FIG. 1), bellows 6 follow the seat back 4 and extend therefrom to wall 12 thereby covering the portion of fixed toilet 14 which would otherwise then be exposed. Bellows 6 may optionally be track-mounted upon track 25 to provide guidance and added bellows stability in the embodiment of FIG. 1.

To take advantage of the space between seat back 4 and sidewall 12 within the interior of bellows 6, a storage compartment 8 may be provided therein. The compartment 8 may be provided with a lid opening 22 for providing access thereto mounted via hinge 23 secured partially to seat back 4. Cover portion 22 may thereby swing upwards in the direction of arrow B and provide access into storage area 8. Cover 22 may further contain a grasping handle (not shown) to lift the same and magnetic catch (not shown) to secure the same in its closed position. Note that the storage compartment 8 will track forward with bellows 6 when the combination seat 2 is placed in its vanity configuration.

FIG. 1 illustrates in phantom the combination seat 2 in its forward, vanity configuration. With the seat 2 in such a configuration, convenient access to vanity mirror 20 and sink 18 is provided to the occupant who may desire to utilize these facilities while being seated on the combination seat 2. Seat cover 1 is preferably in its closed position in this configuration.

Note that with the seat 2 in its retracted toilet configuration (shown in bold lines in FIG. 1), sufficient leg room is made available to an occupant either sitting on the toilet ring 13 or standing facing vanity mirror 20 or sink 18.

Note that the combination toilet and vanity of the instant invention may be easily adapted within an aircraft fuselage 12, so as not to interfere, e.g., with transit ductwork 10.

Figure 2:
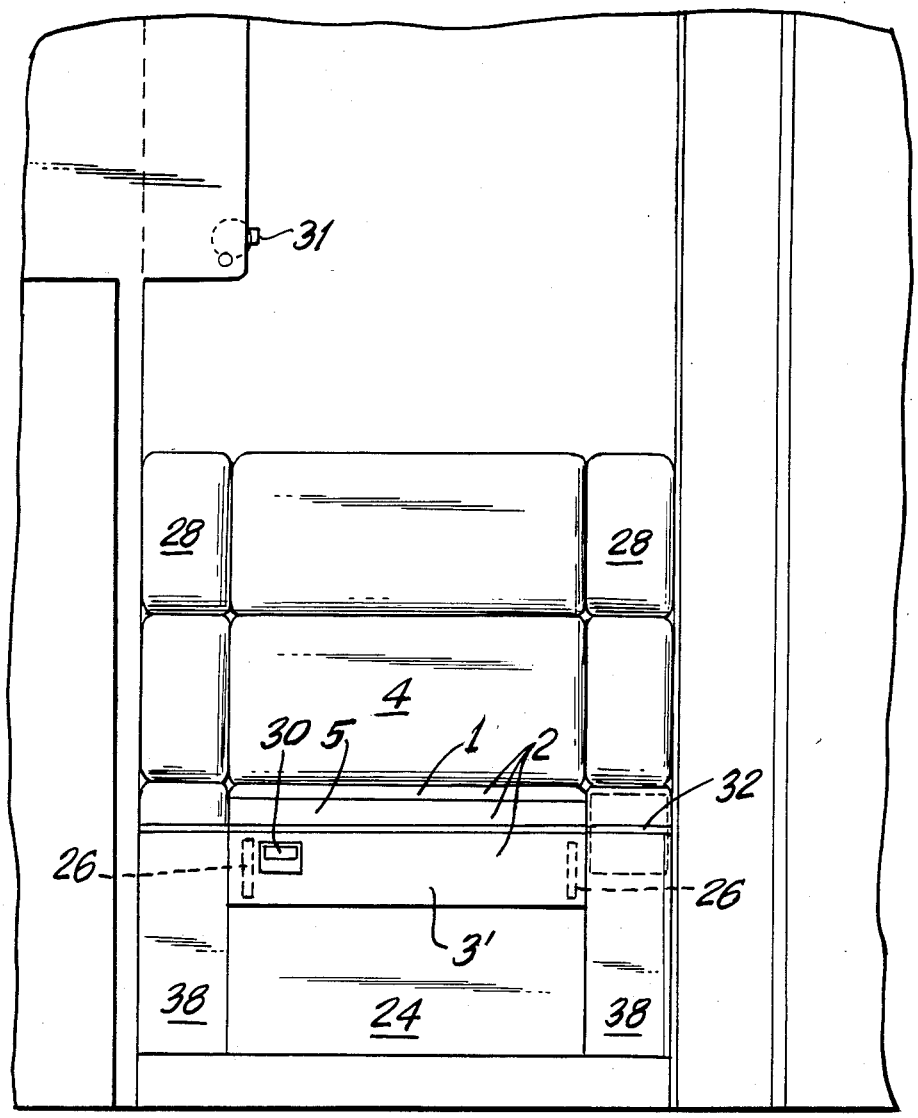
FIG. 2 is a front elevation of a combination toilet and lavatory seat in accordance with the instant invention, the combination seat being shown in its toilet configuration.

FIG. 2 is a front elevation of a lavatory portion including a combination toilet and vanity seat 2 according to the instant invention. Since at least one preferred embodiment of the invention includes luxury features, leather covers may be provided for seatback portion 4, decorative back side panels 28, and side portions 38. Furthermore, a toilet paper dispensing assembly 32 may be provided within one of the sides 38 for providing easy access by the user.

Further illustrated in FIG. 2 is flush button 31 for operating the known flushing mechanism of the toilet.

Combination seat 2 is again shown in FIG. 2 as comprising seat cover 1, seat portion 5, and decorative front side portion 3'. A decorative seat base 24 may also be provided below the level of seat 2.

FIG. 2 further illustrates seat release 30 for allowing the occupant to move combination seat 2 between its toilet seat configuration and its vanity seat configuration. Recall that the toilet ring 13 (not shown in FIG. 2) in the embodiment of FIG. 1 does not track with the combination seat 2, but may be made to track therewith if desired.

The combination seat 2 may travel along heavy duty travel components such as a Grant Slide 26 (FIG. 2) commonly provided in drawer mechanisms. Thus, on each side of the toilet 14, one of the slide components may be fixed to the moveable combination seat while the other is rigidly secured to an adjacent fixed surface, such as the toilet 14 itself, fixed respective the toilet 14. The seat 2 will then be able to freely traverse the path of the slide 26 from toilet to vanity configuration. Of course, stopping means to halt the path of traverse may be provided where appropriate and a locking mechanism activated by seat release 30 may be likewise provided to prevent undesired movement.

Other types of tracking and suspension mechanisms may be provided instead of or in addition to the Grant drawer slide mechanisms disclosed herein without departing in any way from the claimed invention. Such means need merely provide support in the toilet and vanity configurations disclosed and may include two separate means, each one effective in a separate configuration.

FIG. 1 illustrates slide portions 27, 29 fixed to seat side portion 3 and fixed toilet housing component 17, respectively. Seat portion 2 is thus able to track forward across slide members 27, 29.

Fixed sides 38 may additionally comprise storage compartments to increase the available storage area within the lavatory.

In one preferred embodiment, combination seat 2 is provided with 12 inches of forward travel. However, sideways travel may be provided within the scope of the invention to provide access to a side installed vanity. The sliding means 26 would then be secured from side-to-side instead of from front to back of the toilet portion 14.

Figure 3:
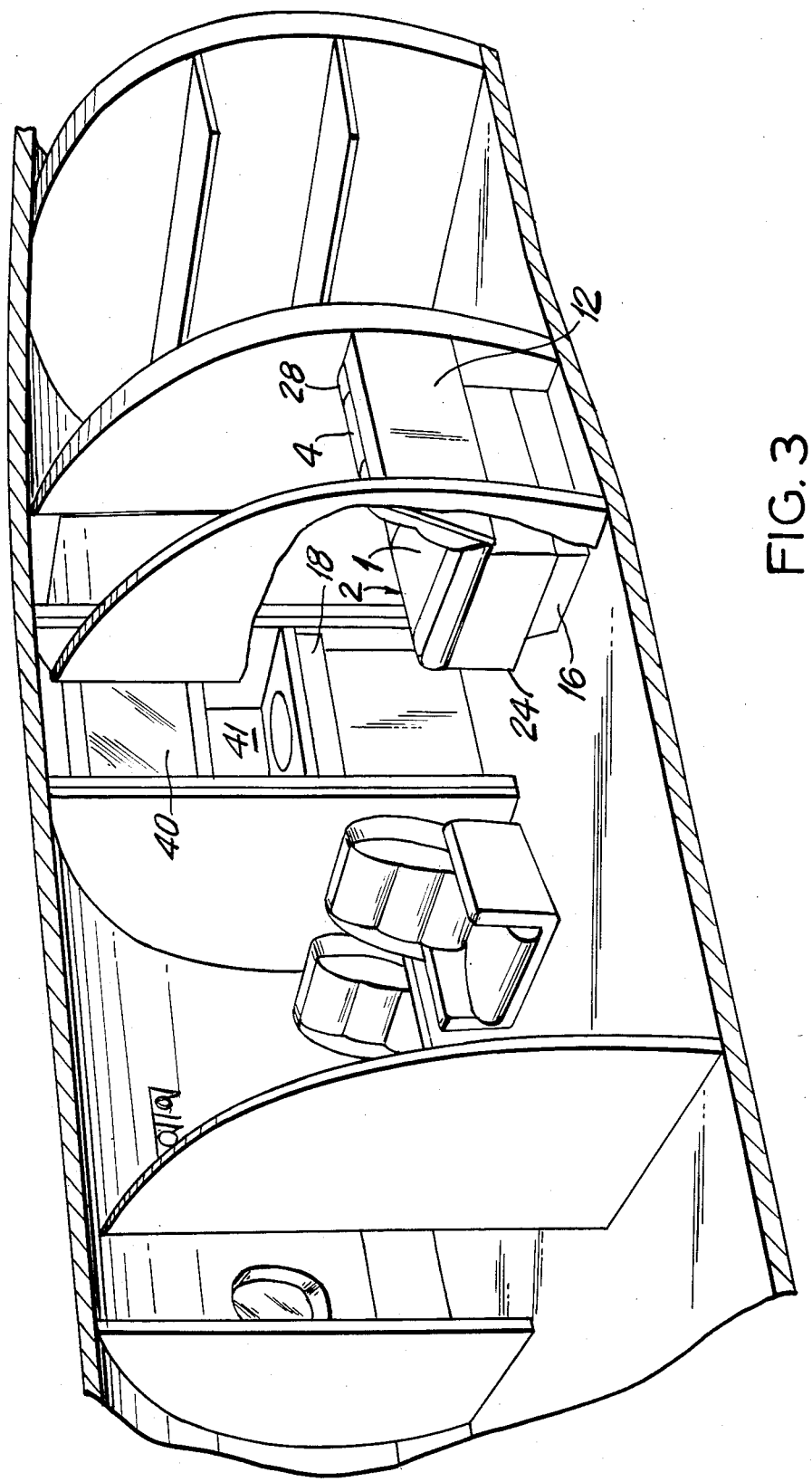
FIG. 3 is a partially cut-away perspective drawing showing a vehicle, such as an aircraft, including a lavatory in accordance with the instant invention.

FIG. 3 illustrates a vehicle, such as an aircraft, including a lavatory according to the instant invention, comprising vanity portion 40 and combination toilet and vanity seat portion 2. A wall of mirrors 41 may be provided about sink 18.

Although FIGS. 1, 2 and 3 illustrate the invention installed on board an aircraft, it will, of course, be understood that the invention may as readily be applied in other forms of vehicles, such as trains, buses, or campers, and may even be applied within ground buildings without departing in any way from the scope of the invention. Similarly, although the invention has been disclosed in detail with regard to the particular embodiments disclosed in the drawings, this description should in no way way limit the spirit of the invention or the scope of claims which follow.

What is claimed:

1. A lavatory, comprising:
   a bowl housing fixed in position respective a lavatory floor, said bowl housing at least partially concealing a fixed position toilet bowl;
   a toilet seat portion;
   a vanity, fixed respective said lavatory floor and displaced from said bowl housing;
   supporting means for supporting said toilet seat portion in a horizontal plane directly over said toilet bowl in a first configuration and for supporting said toilet seat portion displaced from said toilet bowl in a horizontal plane in a second configuration, said supporting means being integral with said fixed position bowl housing, said vanity and said bowl housing being positioned with respect to each other such that said toilet seat functions as a vanity seat in said second configuration substantially forwardly adjacent said vanity;

a chair back fixed respective said toilet seat and moveable therewith; and bellows, said bellows being secured at one end thereof to a fixed wall behind said bowl housing and at an opposite end thereof to said chair back, said bellows being compressed when said toilet seat is in said first configuration and extended when said toilet seat is in said second configuration, said bellows at least partially covering said toilet bowl when said toilet seat is in said second configuration.

2. A lavatory, as recited in claim 1, wherein said bowl housing is fixed on board a vehicle.

3. A lavatory, as recited in claim 2, wherein the vehicle is an aircraft.

4. A lavatory, as recited in claim 1, wherein said supporting means includes a slide and track.

* * * * *